United States Patent [19]

Boley

[11] Patent Number: 4,535,799

[45] Date of Patent: Aug. 20, 1985

[54] AUTOMATIC LIQUID SHUT-OFF VALVE

[76] Inventor: Robert E. Boley, 1802 Tremont, Massillon, Ohio 44646

[21] Appl. No.: 666,157

[22] Filed: Oct. 29, 1984

[51] Int. Cl.³ .............................................. F16K 31/22
[52] U.S. Cl. .................................... 137/174; 137/192; 137/202; 137/411
[58] Field of Search ............... 137/173, 174, 192, 202, 137/433, 175, 176, 411

[56] References Cited

U.S. PATENT DOCUMENTS

| | | | |
|---|---|---|---|
| 368,173 | 7/1888 | White | 137/202 |
| 2,388,481 | 11/1945 | Green | 137/202 X |
| 2,671,527 | 3/1954 | Moon | 137/202 UX |
| 2,867,231 | 1/1959 | Gerstmann | 137/202 |
| 3,590,850 | 7/1971 | Grise | 137/192 |
| 3,828,806 | 8/1974 | Glos | 137/192 |

Primary Examiner—Alan Cohan
Attorney, Agent, or Firm—Harpman & Harpman

[57] ABSTRACT

A valve for incorporation in a gas line through which liquid entrained gas passes, positions a valve seat across the line and arranges a sump adjacent to and upstream of the valve seat. A spherical valve element of a specific gravity less than the entrained liquid in the gas stream is positioned in the sump on a second valve seat therein communicating with a liquid outlet. Entrained liquid in the gas stream collects in the sump, floats the spherical valve element upwardly where the gas flow moves it horizontally into the valve seat in the gas line thus closing the gas line and opening the liquid drain.

6 Claims, 2 Drawing Figures

AUTOMATIC LIQUID SHUT-OFF VALVE

BACKGROUND OF THE INVENTION

1. Technical Field

This invention relates to valves arranged in a pipe line or the like in which gas and sometimes liquid, such as water, is conveyed and wherein the valves operate to stop the flow of gas when liquid is present.

2. Description of the Prior Art

Prior devices of this type usually employ ball valves caged in a valve body through which the gas and entrained liquid is directed, the arrangement being such that collection of liquid floats a ball valve in a cage upwardly into sealing relation with an outlet port. Such prior art devices may be seen in U.S. Pat. Nos. 386,173, 2,388,481, 2,671,527 and 2,867,231.

In the first three of the above patents, the ball valve elements are caged in vertically positioned cages of diameters slightly greater than the ball valves, the cages being positioned in relatively larger housings into which the gas and entrained liquid is directed.

In U.S. Pat. No. 386,173 the ball valve will float upwardly on such liquid and engage a horizontally disposed valve seat formed in a vertical outlet port defining structure.

In U.S. Pat. No. 2,388,481, a similar arrangement floats the ball valve vertically into engagement with a horizontally disposed valve seat in a vertical passageway communicating with the outlet port of the device.

In U.S. Pat. No. 2,671,527, a horizontally disposed valve seat receives the ball valve floated upwardly thereagainst by liquid in the device, the ball valve acting to close the valve seat in the vertical portion of the outlet and simultaneously move a plunger actuating an alarm.

In U.S. Pat. No. 2,867,231, a pair of spherical members are connected to one another in spaced vertical relation by a cord or a cable with one of the spherical members resting on a platform below a vertically arranged valve seat communicating with an outlet port. Liquid in the housing floats the lower spherical member upwardly and thus permits the upper spherical element to move upwardly from the platform and theoretically into the vertically positioned valve seat thus blocking the outlet port.

The present invention, while utilizing a spherical valve element, provides an improved structure in that a very small amount of liquid will elevate the spherical valve element to a position where the cross flow of the gas will move it into seating relation in the vertically arranged valve seat.

SUMMARY OF THE INVENTION

A gas shut-off valve having the dual function of shutting off gas flow through a controlled pipe and separating liquid from the gas passing through the device, comprises essentially a T-fitting positioned in the controlled gas line with a vertically arranged valve seat on the downstream side of the T-fitting and a tubular member with an apertured cap depending from the T and forming a sump. A spherical valve element that floats on liquid such as may be formed in gas flowing through the device is positioned on a horizontally disposed valve seat controlling a drain orifice, liquid from the gas stream builds up in the sump and lifts the spherical valve element which floats thereon to a position where it is partially positioned in the horizontal gas stream extending between the inlet side of the device and the outlet port as defined by the vertical valve seat whereupon the lightweight, floatable spherical valve element will be moved by the gas stream into seating engagement in the vertically positioned valve seat and thus stop the flow of gas through the device. The device, as hereinafter described, will operate automatically upon accumulation of fluid as occurs upon malfunction of a control device upstream, and protects downstream devices from liquid damage. The device also operates, when desired, to collect liquid, stop the gas flow and drain the liquid automatically as when small amounts of liquid are present in the gas flow. This occurs when liquid in the sump of the device floats the spherical valve element upward and away from an open drainage port.

DESCRIPTION OF THE PREFERRED EMBODIMENT

Figure 1:
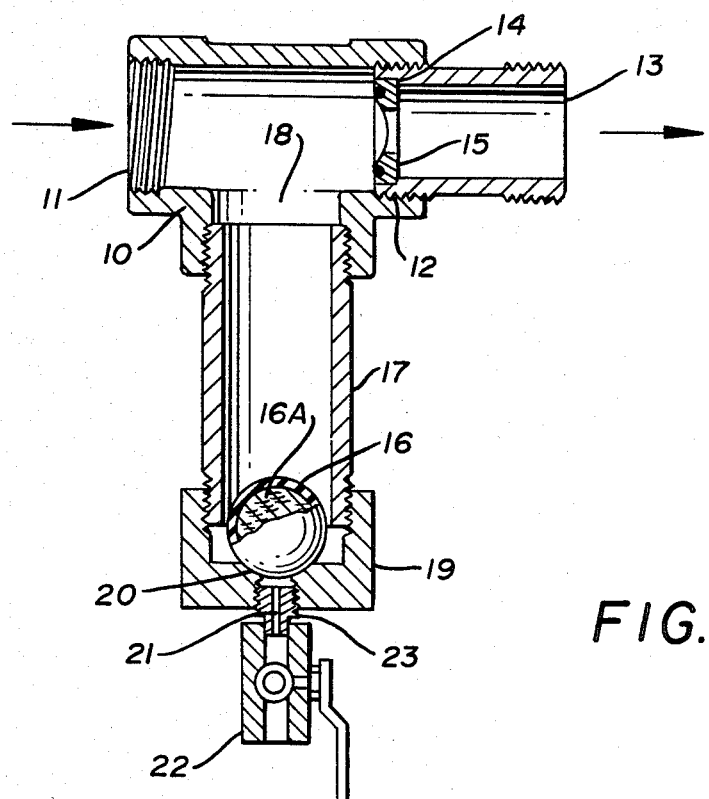
FIG. 1 is a vertical section through the device with parts in cross section and parts broken away and showing a manually controlled valve added to the automatic valve at the bottom of the device.

By referring to the drawings and FIG. 1 in particular it will be seen that the gas shut off valve consists of a few relatively simple inexpensive parts including a T 10 having a threaded inlet port 11 and a threaded outlet port 12. A nipple 13 is shown threadably engaged in the outlet port 12 and is provided with an annular shoulder 14 against which an annular valve seat 15 is secured. The annular valve seat 15 is formed with a radius which matches that of a floatable spherical valve element 16 which is normally positioned in a tube 17 threadably engaged in the portion of the T fitting defining a horizontal opening 18 in the lower portion of the T fitting 10. An apertured cap 19 is engaged on the lower end of the tube 17 to form a sump having a shaped valve seat 20 of the same configuration as the spherical valve element 16. The valve seat 20 communicates with a passageway 21 which comprises a drain for fluid collected in the sump formed by the tube 17 and the apertured cap 19.

The spherical valve element 16 is preferably formed of a core 16A of very lightweight material such as cork or polyurethane foam or the like and enveloped in a coating of resilient material, such as rubber or the like, of sufficient thickness to enable the spherical valve element to conform to the configuration of the valve seat 15 and/or the valve seat 20 in the device as hereinbefore described.

As illustrated in FIG. 1 of the drawings, a manually operated valve 22 is engaged on a fitting 23 in which the passageway 21 is formed so that if desired the drain passageway 21 may be manually closed and/or opened thus overriding the automatic operation of the spherical valve element 16.

Figure 2:
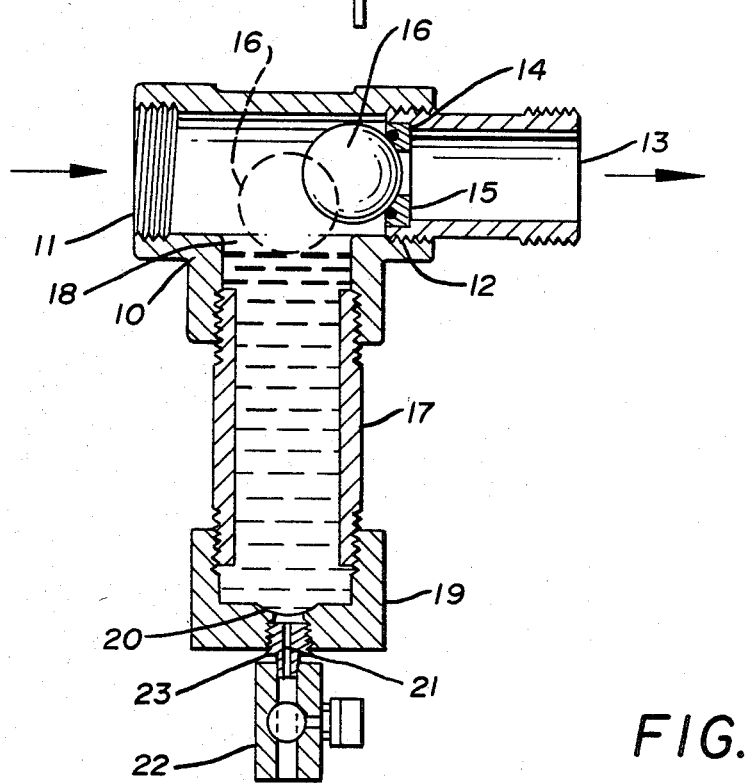
FIG. 2 is a vertical section comparable with that of FIG. 1 showing the device partially filed with fluid and the floatable spherical valve element closing the gas outlet port.

By referring now to FIG. 2 of the drawings, the device will be seen to have collected liquid such as water entrained in a gas stream flowing into the device through the inlet port 11, the liquid having accumulated in the sump formed by the pipe 17 and its cap 19 sufficiently to cause the spherical valve element 16 to float upwardly until it is located in the gas stream flowing between the inlet port 11 and the outlet port 12. The gas stream then moves the spherical valve element 16 into seating relation in the vertically arranged valve seat 15 and against an O-ring seal thereon which insures a complete gas cut off by the valve. At the same time, assuming the manual valve 22 on the lower end of the sump formed by the pipe 17 and the apertured cap 19 is open, the fluid will rapidly drain away whereupon the spherical valve element will move downwardly in the sump and thus open the outlet port 12.

It will occur to those skilled in the art that the specific gravity of the spherical valve element is important to its successful operation. It must be light enough so that it will float on the liquid, whether it is water or oil that builds up in the sump formed by the pipe 17 and its cap 19, but having sufficient weight that it will move away from the valve seat 15 and thus open the outlet port 12 when the fluid drains out of the lower end of the sump formed by the pipe 17 and the apertured cap 19 and the gas stream stops.

In general use in gas collecting fields and/or pipe lines delivering gas from oil and gas separators in gas fields to service lines, the device of the invention will primarily collect and dispose of water entrained in the gas flow. The presence of the manually operated valve 22 enables a field operator or gas line supervisor to close the valve for a limited time and then upon opening it observe the amount of water or oil collected by the device and thus determine the approximate amount of water or oil entrained in the gas flow being supervised.

It will thus be seen that a simple, inexpensive, and highly efficient gas shut-off valve has been disclosed which functions automatically in collecting and disposing of liquid entrained in gas flowing through the device and which in unusual circumstances with high quantities of liquid acts to stop the gas flow temporarily pending draining of the collected fluid.

Having thus described my invention, what I claim is:

1. A device for interposition in a gas line, said device comprising a hollow body member having oppositely disposed horizontally aligned inlet and outlet ports and a liquid receiving chamber depending therefrom and in communication therewith, a vertically positioned valve seat positioned in the device in said outlet port and a horizontally positioned valve seat positioned in said device in the lower portion of said liquid receiving chamber, a drain opening in said liquid receiving chamber below said horizontally positioned valve seat, a floatable spherical valve element movably positioned in said liquid receiving chamber for movement from a first position on said horizontal valve seat controlling said drain opening to a second position adjacent said vertically positioned valve seat by fluid received in said liquid receiving chamber from said gas line, said spherical valve element being of a size to move partially into the area within said liquid receiving chamber between said inlet and outlet ports so as to be movable by said gas into seating engagement with said vertically positioned valve seat.

2. The device of claim 1 and wherein said floatable spherical valve element is formed of a core of lightweight material having a covering of a resilient material.

3. The device set forth in claim 1 wherein said liquid receiving chamber comprises a T-fitting with inlet and outlet openings on a horizontal plane, a section of pipe engaged in a third opening in said T-fitting in depending vertical relation thereto, an apertured cap on the outer lower end of said section of pipe, a nipple engaged in the outlet opening of said T-fitting and said vertically positioned valve seat positioned in the inner end of said nipple, said valve seat defining a smaller opening than said inlet and outlet openings and having a configuration matching that of said spherical valve element.

4. The device of claim 1 wherein a manually controlled valve is engaged on the lower portion of said liquid receiving chamber and provides a secondary control for said outlet opening therein.

5. The device of claim 1 and wherein said vertically positioned valve seat defines a circular opening of a diameter substantially smaller than the diameter of said horizontally aligned inlet and outlet ports.

6. The device of claim 5 and wherein said circular openings defined by said vertically positioned valve seat is on an axial center line with said horizontally aligned inlet and outlet ports.

* * * * *